US009211810B2

(12) United States Patent
Nagamori

(10) Patent No.: US 9,211,810 B2
(45) Date of Patent: Dec. 15, 2015

(54) VEHICULAR CONTROL APPARATUS

(71) Applicant: MITSUBISHI JIDOSHA KOGYO KABUSHIKI KAISHA, Tokyo (JP)

(72) Inventor: Takeo Nagamori, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/255,511

(22) Filed: Apr. 17, 2014

(65) Prior Publication Data

US 2015/0027798 A1 Jan. 29, 2015

(30) Foreign Application Priority Data

Jul. 24, 2013 (JP) ................................. 2013-153798

(51) Int. Cl.
*B60K 6/52* (2007.10)
*B60L 15/20* (2006.01)
*B60K 6/448* (2007.10)
*B60W 10/08* (2006.01)
*B60W 10/18* (2012.01)
*B60W 20/00* (2006.01)
*B60W 30/18* (2012.01)

(52) U.S. Cl.
CPC .............. *B60L 15/2081* (2013.01); *B60K 6/448* (2013.01); *B60K 6/52* (2013.01); *B60W 10/08* (2013.01); *B60W 10/182* (2013.01); *B60W 20/00* (2013.01); *B60W 30/18027* (2013.01); *B60W 30/18054* (2013.01); *B60W 2710/083* (2013.01); *Y10S 903/947* (2013.01)

(58) Field of Classification Search
CPC ......... B60T 7/12; B60T 1/06; B60L 15/2081; B60K 6/448; B60K 6/52; B60W 10/08; B60W 20/00; B60W 10/182

USPC ........................................................ 180/242
See application file for complete search history.

(56) References Cited

U.S. PATENT DOCUMENTS

| 3,974,897 | A  | * | 8/1976 | Pringle    | 188/196 A |
| 4,030,576 | A  | * | 6/1977 | Pringle    | 188/71.8  |
| 6,692,394 | B2 | * | 2/2004 | Takenaka   | 475/5     |
| 7,751,965 | B2 | * | 7/2010 | Ando et al.| 701/113   |
| 8,666,580 | B2 | * | 3/2014 | Hashimoto  | 701/22    |

(Continued)

FOREIGN PATENT DOCUMENTS

| EP | 2567845 A2    | 3/2013 |
| JP | 2009-143270 A | 7/2009 |
| JP | 4297135 B2    | 7/2009 |

OTHER PUBLICATIONS

European Search Report, mailed May 28, 2015, issued in counterpart European Patent Application No. 14164338.7.

*Primary Examiner* — Tony H. Winner
*Assistant Examiner* — Michael Stabley
(74) *Attorney, Agent, or Firm* — Birch, Stewart, Kolasch & Birch, LLP

(57) ABSTRACT

A vehicle control apparatus includes a PHEV-ECU containing a measuring unit which measures the amount of torsional stress on the front drive shafts in a parking lock state and a control unit which controls the torque of the front motor. When the parking lock state is released, the torque acting as a load on the rotation of the first motor upon the release of the torsional stress on the drive shaft, is determined based on the torsional stress measured. Further, the front motor is controlled to output the determined torque.

6 Claims, 4 Drawing Sheets

(56) References Cited

U.S. PATENT DOCUMENTS

| | | | |
|---|---|---|---|
| 2003/0154945 A1* | 8/2003 | Ando et al. | 123/179.3 |
| 2004/0112654 A1* | 6/2004 | Kozarekar et al. | 180/65.2 |
| 2010/0241305 A1* | 9/2010 | Itabashi et al. | 701/34 |
| 2012/0239237 A1* | 9/2012 | Hashimoto | 701/22 |
| 2012/0316034 A1 | 12/2012 | Lim | |
| 2014/0136039 A1* | 5/2014 | Tanishima et al. | 701/22 |
| 2015/0011359 A1* | 1/2015 | Maruyama et al. | 477/4 |
| 2015/0031488 A1* | 1/2015 | Okuda et al. | 475/5 |

* cited by examiner

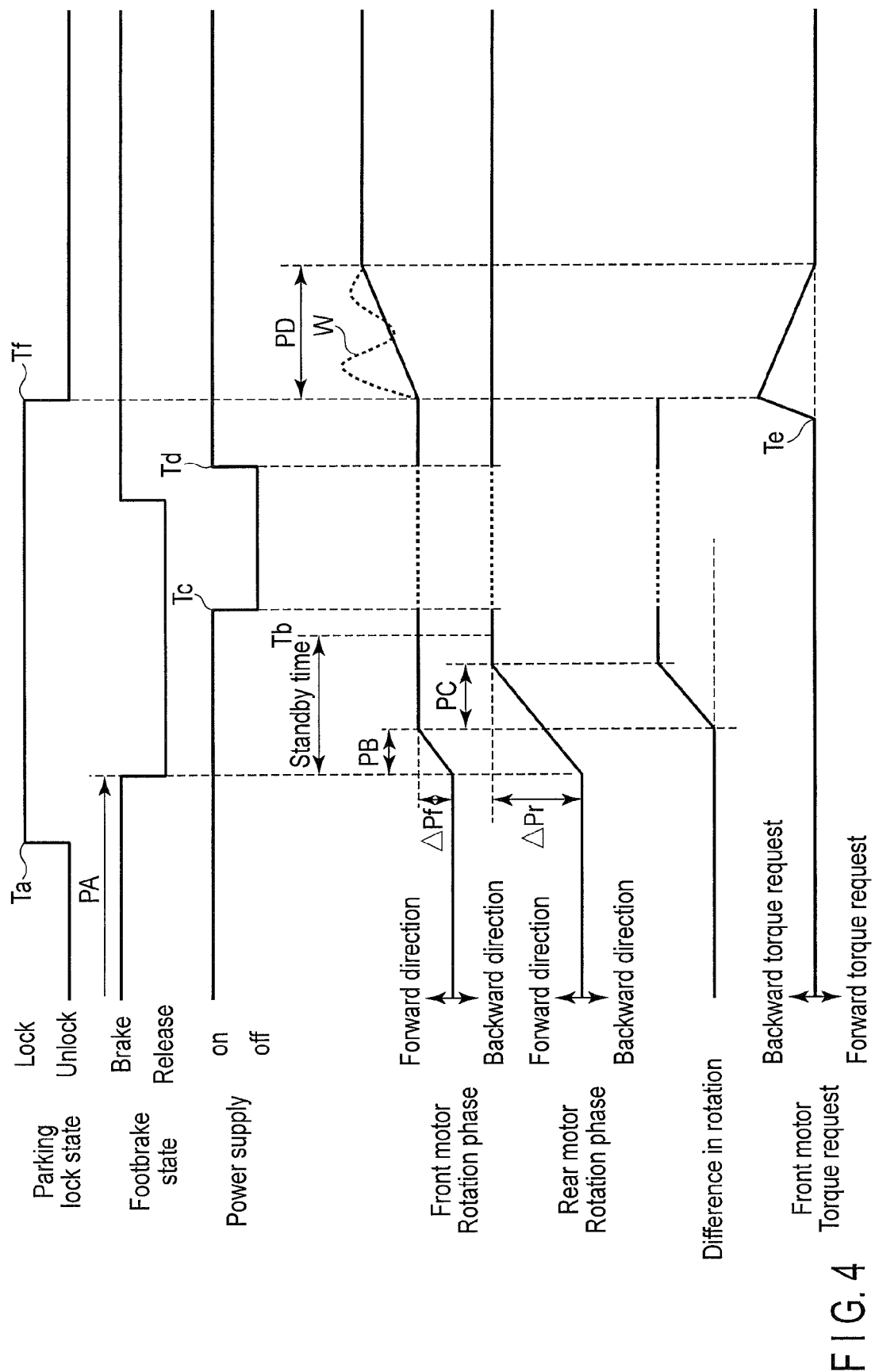
F I G. 4

VEHICULAR CONTROL APPARATUS

CROSS-REFERENCE TO RELATED APPLICATIONS

This application is based upon and claims the benefit of priority from prior Japanese Patent Application No. 2013-153798, filed Jul. 24, 2013, the entire contents of which are incorporated herein by reference.

BACKGROUND OF THE INVENTION

1. Field of the Invention

The present invention relates to a control apparatus for vehicles which produce a driving force with a motor, and more specifically, a vehicular control apparatus with an improved parking lock release operation.

2. Description of the Related Art

In general, the parking lock units of automobiles are configured to lock the front reduction gear from rotating.

When an automobile is parked on a slope, the front wheels are still forced to rotate even in the parking lock state. Here, since the rotation of the front drive shaft is inhibited by the parking lock unit, the front drive shaft does not substantially rotate. However, a small torsional stress is exerted on the front shaft drive, and therefore actually, the automobile moves slightly when the parking lock is executed.

Then, when the parking lock is released, the torsion stress on the front drive shaft is released, which allows the front reduction gear and the front driving source to rotate abruptly. Because of such an abrupt rotation, vehicular passengers may feel a shock, producing a unpleasant feeling and discomfort.

Techniques for reducing shocks produced when releasing the parking lock such as above are disclosed in Publication 1 (Japanese Patent No. 4297135), Publication 2 (Jpn. Pat. Appln. KOKAI Publication No. 2009-143270) and the like.

Publication 1 teaches a technique of controlling the torque of an electric motor by estimating the torque due to torsion accumulated in a direct coupling range (the range maintained in a power transmission state to the driving wheels, which is on the automatic transmission or between the automatic transmission and driving wheels) while the motive power of the power source is being transmitted to the driving wheels, and controlling the torque of the electric motor based on the estimated torque due to torsion. With the technique of Publication 1, directed to the above-described effect, it is not possible to reduce the shock caused by the torsional stress on the front drive shaft in the parking state.

Publication 2 teaches a technique of producing a vibration controlling torque by detecting the degree of torsional vibration produced when the operation of the parking lock unit is complete, and producing a torque corresponding to the amplitude of the detected vibration. With the technique of Publication 2, directed to the above-described effect, it is not possible to inhibit the initial shock since a vibration controlling torque is not produced until the torsional vibration actually occurs.

BRIEF SUMMARY OF THE INVENTION

An object of the present invention is to provide a vehicular control apparatus configured to inhibit a shock from the initiation of the production thereof, the shock being caused by a torsional stress applied to the drive shaft during a stop state, as the stress is released when the parking lock is released.

The vehicular control apparatus according to the present invention comprises: a first motor configured to drive wheels of one of a front side and a rear side provided on a vehicle; a second motor configured to drive wheels of the other one of the front and rear sides provided on the vehicle; a drive shaft; a first transmission mechanism configured to transmit a driving force produced by the first motor to the wheels of the one of the front and rear sides; a second transmission mechanism configured to transmit a driving force produced by the second motor to the wheels of the other one of the front and rear sides; a parking lock unit configured to create a parking lock state which inhibits transfer of the driving force produced by the first motor; a lock control unit configured to control the parking lock unit to release the parking lock state in response to an operation which requests the release of the parking lock state; a measuring unit configured to measure a torsional stress on the drive shaft in the parking lock state based on a degree of rotation of each of the first motor and the second motor; a determination unit configured to determine a torque acting as a load on the rotation of the first motor, produced when the torsional stress on the drive shaft is released, based on the torsional stress measured by the measuring unit; and a motor control unit configured to control the first motor to output the torque determined by the determination unit.

With the present invention, when releasing the parking lock, the motor is controlled to output a torque to cancel the torsional stress of the drive shaft, based on the torsional stress on the drive shaft during the parking lock state, and thus the shock produced by the torsional stress on the drive shaft during the parking state can be inhibited from its initiation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a timing chart showing the change in the state of the automobile during the parking lock control process shown in FIG. 3.

DETAILED DESCRIPTION OF THE INVENTION (Embodiments)

A control apparatus according to an embodiment will now be described with reference to FIGS. 1 to 4.

It should be first noted that this embodiment will be described in connection with a plug-in hybrid automobile, but the present invention can be carried out similarly in other various types of automobiles as well, which produce a driving force by a motor. Further, the present invention is not necessarily limited to the control of automobiles, but can be applied to the control of various types of vehicles as long as they are of the types which produce a driving force by a motor.

Figure 1:
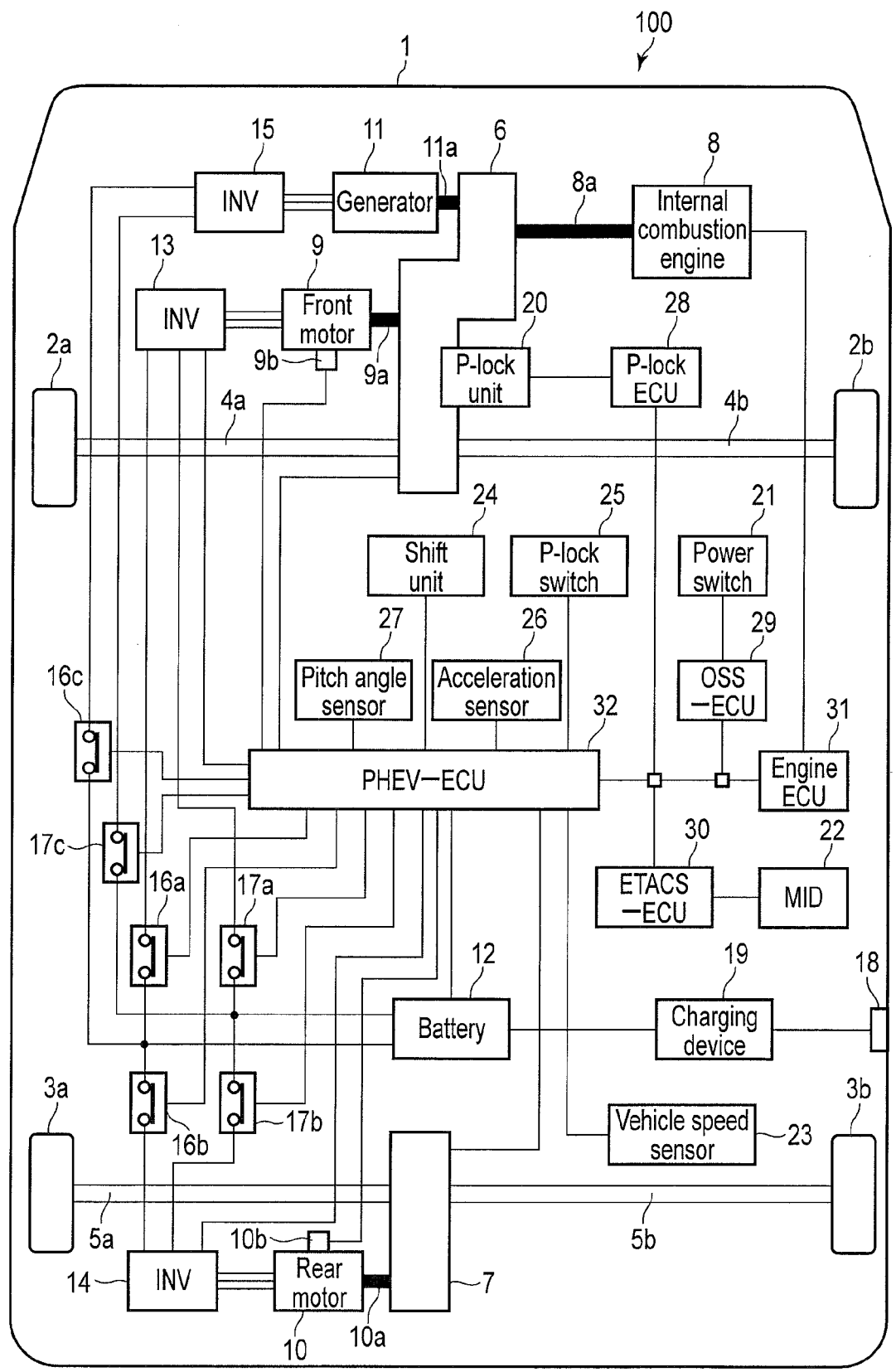
FIG. 1 is a view showing a structure of an automobile equipped with a control apparatus according to an embodiment of the present invention.

FIG. 1 is a diagram showing a structure of an automobile 100. Note that the automobile 100 comprises a number of elements similar to those of other conventional hybrid automobiles, but only some of the elements are actually shown in FIG. 1.

The automobile 100 comprises a main body 1, front wheels 2a and 2b, rear wheels 3a and 3b, front drive shafts 4a and 4b, rear drive shafts 5a and 5b, a front reduction gear 6, a rear reduction gear 7, an internal combustion engine 8, a front motor 9, a rear motor 10, a generator 11, a battery 12, inverters 13, 14 and 15, electromagnetic contactors 16a, 16b, 16c, 17a, 17b and 17c, an external power supply plug 18, a charging device 19, a parking unit (to be referred to as a P-lock unit, hereinafter) 20, a power switch 21, a multi-information display (MID) 22, a vehicle speed sensor 23, a shift unit 24, a parking lock switch (to be referred to as a P-lock switch, hereinafter) 25, an accelerator sensor 26, a pitch angle sensor 27, a parking-lock electronic control unit (P-lock ECU) 28, a one-touch start system electronic control unit (OSS-ECU) 29, an electronic time and alarm control system (ETACS-ECU) 30, an engine electronic control unit (engine-ECU) 31 and a plug-in hybrid electric vehicle electronic control unit (PHEV-ECU) 32.

The main body 1 comprises a chassis and a car body, which hold and support all the other elements and create a space (compartment) for passengers to ride in.

The front wheels 2a and 2b are secured to ends of the front drive shafts 4a and 4b, respectively, and the rear wheels 3a and 3b are secured to ends of the rear drive shafts 5a and 5b, respectively. The front wheels 2a and 2b and the rear wheels 3a and 3b support the main body 1 as they touch the ground, and they rotate to move the main body 1.

The front drive shafts 4a and 4b are configured to support the positions of the front wheels 2a and 2b on the main body 1 in a predetermined state with relative to each other and also to transmit a torque transmitted from the front reduction gear 6 to the front wheels 2a and 2b. The rear drive shafts 5a and 5b are configured to support the positions of the rear wheels 3a and 3b to the main body 1 in a predetermined state relative to each other and also to transmit a torque transmitted from the rear reduction gear 7 to the rear wheels 3a and 3b.

The front reduction gear 6 is configured to support the front drive shafts 4a and 4b to be individually rotatable. The front reduction gear 6 is coupled to a rotating shaft 8a of the internal combustion engine 8, a rotating shaft 9a of the front motor 9 and a rotating shaft 11a of the generator 11, individually.

The front reduction gear 6 consists of various types of gears including a differential gear, shafts, clutches and the like, as they assembled together as conventionally known. The front reduction gear 6 selectively takes the form of the state in which, the rotating shaft 8a is coupled to the front drive shafts 4a and 4b, the rotating shaft 8a is coupled to the rotating shaft 11a, the torque of the rotating shaft 8a is transmitted distributively to the front drive shaft 4a and 4b and the rotating shaft 11a, the rotating shaft 9a is coupled to the front drive shafts 4a and 4b, the rotating shaft 11a is coupled to the front drive shafts 4a and 4b or the front drive shafts 4a and 4b are allowed to rotate freely. Further, the front reduction gear 6 is configured to reduce the rate of rotation of the engine 8 and front motor 9 and transmit the reduced rotation to the front drive shafts 4a and 4b.

The rear reduction gear 7 is configured to support the rear drive shafts 5a and 5b to be individually rotatable. The rear reduction gear 7 is coupled with a rotating shaft 10a of the rear motor 10. The rear reduction gear 7 consists of various types of gears including a differential gear, shafts, clutches and the like, as they assembled together as conventionally known. The rear reduction gear 7 selectively takes the form of the state in which, the rotating shaft 10a is coupled to the rear drive shafts 5a and 5b or the rear drive shafts 5a and 5b are allowed to rotate freely. Further, the rear reduction gear 7 is configured to reduce the rate of rotation of the rear motor 10 and transmit the reduced rotation to the rear drive shafts 5a and 5b.

The internal combustion engine 8 is configured to produce the torque from the combustion of fuel to rotate the rotating shaft 8a. As a typical case, the internal combustion engine 8 uses gasoline as the fuel. But the fuel is not limited to this, and the engine may be of another type which uses a fuel other than gasoline, for instance, another fuel oil such as light oil, or liquefied petroleum gas (LPG). When the front reduction gear 6 couples the rotating shaft 8a and the front drive shafts 4a and 4b to each other, the internal combustion engine 8 turns the front wheels 2a and 2b.

The front motor 9 and the rear motor 10 produce torques from electrical energy, to turn the rotating shafts 9a and 10a. When the front reduction gear 6 couples the rotating shaft 8a and the front drive shaft 4a and 4b to each other, the front motor 9 turns the front wheels 2a and 2b. When the rear reduction gear 7 couples the rotating shaft 10a and the rear drive shafts 5a and 5b to each other, the rear motor 10 turns the rear wheels 3a and 3b. In this manner, the front motor 9 and rear motor 10 function as the first and second motors, respectively. The front motor 9 and rear motor 10 are equipped with rotational angle sensors 9b and 10b. The rotation angle sensors 9b and 10b are configured to detect rotational phases of the front motor 9 and rear motor 10.

The front drive shafts 4a and 4b and the front reduction gear 6 described above constitute a first transmission mechanism configured to transmit a driving force to the front wheels 2a and 2b of one of the two pairs of wheels. Further, the front drive shafts 4a and 4b function as first drive shafts and the front reduction gear 6 functions as a first reduction gear. On the other hand, the rear drive shafts 5a and 5b, which function as second drive shafts, and the rear reduction gear 7, which function as second reduction gear, constitute a second transmission mechanism configured to transmit a driving force to the rear wheels 3a and 3b of the other one of the two pairs of wheels. It should be noted here that the drive shafts referred to in connection with the present invention are equivalent to, in this embodiment, the first drive shafts, that is, the front drive shafts 4a and 4b.

The generator 11 is configured to utilize the rotation of the rotating shaft 11a to produce electricity by electromagnetic induction. When the front reduction gear 6 couples the rotating shaft 8a and the rotating shaft 11a to each other, the generator 11 produces electricity by utilizing the torque produced by the internal combustion engine 8. When the front reduction gear 6 couples the front drive shafts 4a and 4b with the generator 11 to each other, the generator 11 produces electricity by utilizing the torques of the front drive shafts 4a and 4b.

The battery 12 applies a direct current.

The inverters 13 and 14 are configured to convert the direct current output from the battery 12 into an alternating current. The inverters 13 and 14 may be of a conventional structure which contains switching elements including insulated gate bipolar transistor (IGBT). The inverter 13 is configured to supply electrical energy to the front motor 9 by applying the alternating current to the front motor 9. The inverter 14 is configured to drive the rear motor 10 by supplying the alternating current to the rear motor 10. The inverters 13 and 14 are configured to change a switching frequency of a switching element, an output current and a frequency (output frequency) thereof, under the control of PHEV-ECU 32.

The inverter 15 is configured to convert an alternating current produced by the generator 11 into a direct current. The direct current obtained by the converter 15 is supplied to the battery 12.

The contactors 16a, 16b and 16c are inserted between the positive electrode of the battery 12 and the inverters 13, 14 and 15, respectively. The contactors 16a, 16b and 16c are configured to electrically connect or disconnect (turn on/off) the contact between the positive electrode of the battery 12 and the inverters 13, 14 and 15, respectively, under the control of PHEV-ECU 32.

The contactors 17a, 17b and 17c are inserted between the negative electrode of the battery 12 and the inverters 13, 14 and 15, respectively. The contactors 17a, 17b and 17c are configured to electrically connect or disconnect (turn on/off) the contact between the negative electrode of the battery 12 and the inverters 13, 14 and 15, respectively, under the control of PHEV-ECU 32.

The external power supply plug 18 is configured to receive a cable to be connected thereto for power supply from an external power source, if necessary. When a cable is connected thereto, the external power supply plug 18 serves to electrically connect the cable and the charge device 19.

The charge device 19 is configured to charge the battery 12 by the power supplied from the external power source via the cable connected to the external power supply plug 18.

The P-lock unit 20 is configured to selectively constitute a lock state in which the front drive shafts 4a and 4b are locked by mechanical engagement not to rotate or an unlock state in which the lock is released. The lock state is equivalent to the parking lock state in which the transfer of the driving force by the first reduction gear is inhibited.

The power switch 21 is configured to be operated by a user to instruct a start and stop of the automobile 100.

The multi-information display 22 is mounted in, for example, a meter panel equipped in the main body 1, and configured to indicate various types of information including shift positions.

The vehicle speed sensor 23 is configured to detect the running speed of the automobile 100 based on the rate of rotation of, for example, the rear drive shaft 5b.

The shift unit 24 includes a shift lever and a group of sensors to detect the position of the shift lever. The shift unit 24 is configured to enter an instruction from the driver regarding the changing of a running mode (shift position) in response to the operation of the shift lever by the driver.

The P-lock switch 25 is configured to enter an instruction from the driver regarding the switching between the lock state and unlock state of the P-lock unit 25 in response to the operation of the shift lever by the driver.

The accelerator sensor 26 is configured to detect the degree of opening of the throttle as the degree of depression of the accelerator pedal, not shown in the figure.

The pitch angle sensor 27 is configured to detect the angle of pitch of the main body 1.

The P-lock ECU 28 is configured to control the P-lock unit 20.

The OSS-ECU 29 is configured to perform power control of each member after authentication by communications when the power switch 21 is operated by the user.

The ETACS-ECU 30 is configured to control various types of electrical equipment mounted in the automobile 100. The electrical equipment subjected to the control of the ETACS-ECU 30 is, for example, a multi-information display 22, and also a headlight, a door mirror, a windshield wiper, a door lock mechanism, interior lighting equipment, a security alarm, which are omitted from FIG. 1, and the like.

The ETACS-ECU 30 is configured to obtain necessary information from the OSS-ECU 29, engine ECU 31 and PHEV-ECU 32 as needed, by telecommunications, and control this electrical equipment to realize predetermined operations. For example, the ETACS-ECU 30 automatically extends the door mirror from a retracted position, if so, when the vehicle speed is greater than or equal to a predetermined value. Further, the ETACS-ECU 30 controls the multi-information display 22 to display a shift position corresponding to a running mode of the automobile 100.

The engine ECU 31 is configured to control the operation of the internal combustion engine 8. The engine ECU 31 is also configured to obtain from the ETACS-ECU 30 and the PHEV-ECU 32 information necessary to carry out various types of control, as needed, by telecommunications.

The PHEV-ECU 32 is configured to perform various types of control for the running of the automobile 100. For example, the PHEV-ECU 32 controls the states of the front reduction gear 6 and rear reduction gear 7 in accordance with the running state of the automobile 100. Further, the PHEV-ECU 32 controls the states of the inverters 13 and 14 and the contactors 16a, 16b, 16c, 17a, 17b and 17c. For example, in an electric vehicle (EV) mode running state, the PHEV-ECU 32 sets the front reduction gear 6 in a state to couple the rotating shaft 9a of the front motor 9 and the front drive shafts 4a and 4b with each other. Further, the PHEV-ECU 32 sets the rear reduction gear 7 in a state to couple the rotating shaft 10a of the rear motor 10 and the rear drive shafts 5a and 5b with each other. At the same time, the PHEV-ECU 32 sets all of the contactors 16a, 16b, 16c, 17a, 17b and 17c to be on.

With this state, the PHEV-ECU 32 calculates a required running power according to the degree of opening of the accelerator detected by the accelerator sensor 26. Then, the PHEV-ECU 32 controls the outputs of the inverters 13 and 14 and thus drive the front motor 9 and the rear motor 10 so as to obtain the calculated running power. Furthermore, the PHEV-ECU 32 controls the states of the front reduction gear 6, the rear reduction gear 7, the inverters 13 and 14 and the contactors 16a, 16b, 16c, 17a, 17b and 17c so as to establish various types of operation states realized for other conventional hybrid cars. The PHEV-ECU 32 obtains information necessary information for various types of controls from the P-lock ECU 28, the ETACS-ECU 30 and the engine ECU 31 by telecommunications, as needed.

Incidentally, the PHEV-ECU 32 is equipped with a computer comprising a central processing unit (CPU), a read-only memory (ROM), a random-access memory (RAM) and a non-volatile memory. The PHEV-ECU 32 realizes out the above-described controls by carrying out processing according to programs stored in the ROM while the CPU accessing the RAM and non-volatile memory as needed. The ROM or non-volatile memory is configured to store a pattern data table.

Figure 2:
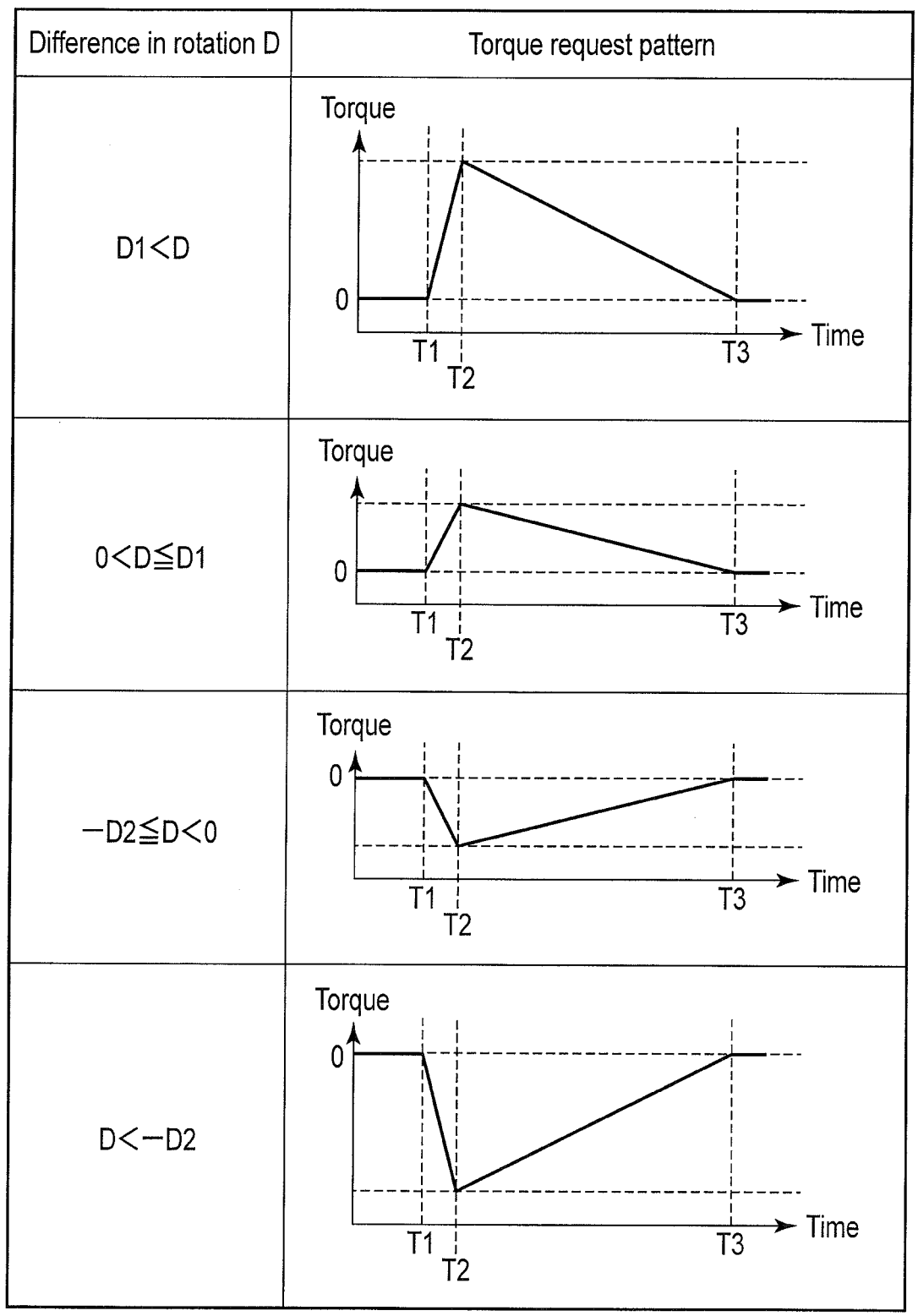
FIG. 2 is a view schematically showing an example of a pattern data table.

FIG. 2 is a diagram schematically showing an example of the pattern data table.

As shown in FIG. 2, the pattern data table indicates the torque difference D and four torque request patterns while they are associated with each other. Each torque request patterns indicate a change in the torque to be requested along with time.

Next, the operation of the automobile 100 having the above-described structure will be described.

Figure 3:
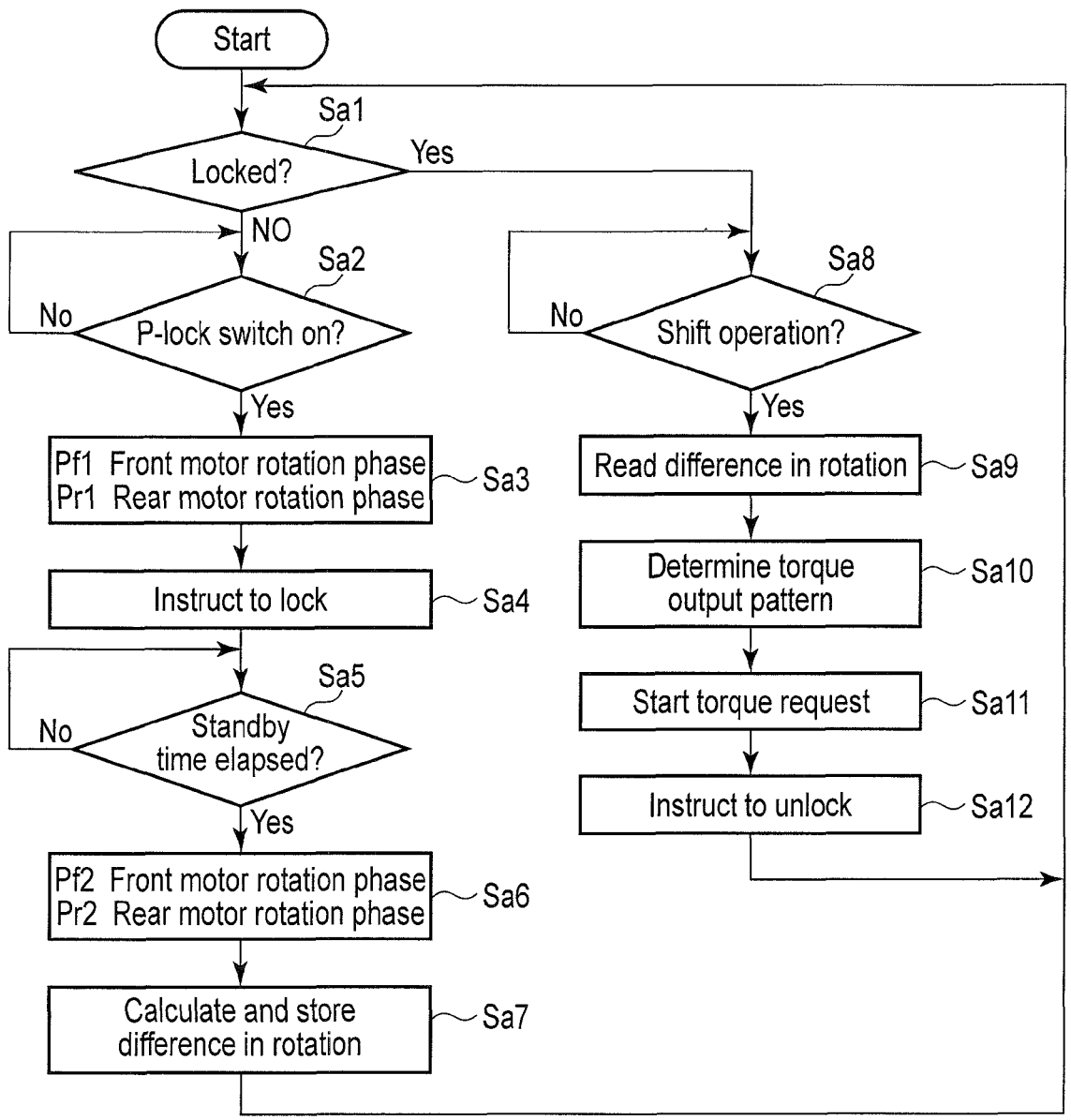
FIG. 3 is a flowchart of a parking lock control process with the PHEV-ECU 32 shown in FIG. 1.

While a current is being supplied thereto, the PHEV-ECU 32 executes the parking lock control process shown in FIG. 3. It should be noted here that the contents of the process described below are only one example, and various types of processes which enable to obtain similar results can be used as needed.

In step Sa1, the PHEV-ECU 32 determines whether or not the parking lock unit 20 is in the lock state. When it is determined as NO, that is, the parking lock unit 20 is in the unlock state, the PHEV-ECU 32 proceeds to step Sa2.

In step Sa2, the PHEV-ECU 32 stands by for the P-lock switch 25 to be turned on. When the P-lock switch 25 is turned on by the operation of the driver, the PHEV-ECU 32 determine as YES and proceeds to step Sa3.

In step Sa3, the PHEV-ECU 32 substitutes the rotational phases of the front motor 9 and the rear motor 10 detected respectively by the rotational angle sensors 9b and 10b at this point, into variables Pf1 and Pr1, respectively.

In step Sa4, the PHEV-ECU 32 instructs the P-lock-ECU 28 to set the P-lock unit 20 in the lock state. Upon this instruction, the P-lock-ECU 28 sets the P-lock unit 20 in the lock state.

FIG. 4 is a timing chart showing the change in the state of the automobile 100 in connection with the parking lock controlling process.

In general, the movement of the automobile 100 is controlled with a footbrake, not shown in the figure. When the automobile 100 is stopped, the P-lock switch 25 is turned on while the footbrake is still in the braking state. Then, after the P-lock unit 20 is set in the lock state, the footbrake is released. Thus, the braking with the footbrake is carried out in a period PA in FIG. 4, the state is shifted to the parking lock state at a time point Ta in the middle of the period. But, there may be also such a case where the footbrake is released beforehand, and the P-lock switch 25 is turned on afterwards.

In the parking lock state, the rotations of the front drive shafts 4a and 4b are inhibited with the P-lock unit 20 via the front reduction gear 6. However, due to the play of the gear built in the front reduction gear 6, and the like, the front motor 9 rotates in a period PB. During this period, the automobile 100 slightly moves to cause the rear wheels 3a and 3b to rotate. As a result, the rear motor 10 is rotated during the period PB.

When the front drive shafts 4a and 4b are completely locked so as not to rotate, the front motor 9 does not rotate any more as well. But, after this, a torsional stress is applied to the front drive shafts 4a and 4b, and thus the front wheels 2a and 2b rotate in a period PC. Due to the rotation of the front wheels 2a and 2b, the automobile 100 further moves, and thus the rear wheels 3a and 3b further rotate as well. As a result, the rear motor 10 is rotated during the period PC.

As described above, the front motor 9 rotates during the period PB only, whereas the rear motor 10 rotates during the period PC as well in addition to the period PB. For this reason, the degree of rotation of the front motor 9 after being set in the parking lock state at the time point Ta is different from that of the rear motor 10.

The degrees of rotation of the front motor 9 and the rear motor 10 due to the above-described phenomenon corresponds to the differences in rotational phase, $\Delta Pf$ and $\Delta Pr$, of the front motor 9 and the rear motor 10, respectively, before and after rotation.

In step Sa5, the PHEV-ECU 32 stands by for the standby time to elapse from the time when the parking lock state is set or the point when the footbrake is released, whichever the later. The standby time is predetermined as a longer period which can be resulted as the sum of the durations of the period PB and period PC. In other words, the PHEV-ECU 32 stands by for the timing which is considered that the above-described rotations of the front motor 9 and the rear motor 10 have been reliably stopped. Then, when the standby time elapses and it is determined as YES in step Sa5, the PHEV-ECU 32 proceeds to step Sa6. In FIG. 4, the time point Tb corresponds to this timing.

In step Sa6, the PHEV-ECU 32 substitutes the rotational phases of the front motor 9 and the rear motor 10 detected respectively by the rotational angle sensors 9b and 10b at this point, into variables Pf2 and Pr2, respectively.

In step Sa7, the PHEV-ECU 32 calculates the difference in rotation between the front wheels 2a and 2b and the rear wheels 3a and 3b, and stores it in the non-volatile memory built in the PHEV-ECU 32. More specifically, the difference can be obtained in the following manner. That is, the variables Pf1 and Pr1 represent the rotational phases before rotation, whereas the variables Pf2 and Pr2 represent the rotational phases after rotation. Therefore, $\Delta Pf$ can be obtained by subtracting Pf2 from Pf1. Further, $\Delta Pr$ can be obtained by subtracting Pr1 from Pr2. Then, the difference in rotation can be obtained by subtracting $\Delta Pf$ from $\Delta Pr$. The difference in rotation calculated here represents the torsional stress in the front drive shafts 4a and 4b. Thus, the PHEV-ECU 32 functions as a measuring unit. After this, the operation of the PHEV-ECU 32 returns to step Sa1.

After the P-lock unit 20 is set in the lock state as described above, the PHEV-ECU 32 determines YES in step Sa1. In this case, the PHEV-ECU 32 proceeds to step Sa8.

In the meantime, in the example of the operation shown in FIG. 4, when the key ignition of the automobile 100 is turned off at the time Tc, which is later than the time Tb, the power supply to the PHEV-ECU 32 is stopped (OFF). Therefore, the PHEV-ECU 32 halts operation. But, it is preferable that the power supply to the PHEV-ECU 32 be continued until the PHEV-ECU 32 finishes the operation of step Sa7.

When the power supply is restarted at the time td, the PHEV-ECU 32 restarts the parking lock control process. In this case, since the P-lock unit 20 is in the lock state, the PHEV-ECU 32 determines YES in step Sa1, and proceeds to step Sa8.

In step Sa8, the PHEV-ECU 32 stands by for the shift lever to be operated. When the shift unit 24 detects that the shift lever is operated, the PHEV-ECU 32 determines as YES, and proceeds to step Sa9.

In step Sa9, the PHEV-ECU 32 reads the difference in rotation, stored in step Sa7 from the non-volatile memory.

In step Sa10, the PHEV-ECU 32 determines a torque output pattern associated with the read difference in rotation in the pattern data table, as one to be used this time.

In step Sa11, the PHEV-ECU 32 starts a torque request to obtain a torque output according to the torque output pattern determined as above. In the example shown in FIG. 4, the shift lever is operated at the time Te, and the torque request is started in reply to this.

The torque request is passed to a drive control process executed in another task different from that of the parking lock control process executed by the PHEV-ECU 32. With the drive control process, the front motor 9 is controlled to output a torque corresponding to the torque request. Thus, the PHEV-ECU 32 functions as a motor control unit.

Here, note that $\Delta Pr$ is always larger than $\Delta Pr$ in absolute terms. This is because $\Delta Pf$ corresponds only to the rotation due to the play of the gears, whereas $\Delta Pr$ includes an amount equivalent to the rotation caused by the torsional stress acting on the front drive shafts 4a and 4b in addition to the rotation due to the play of the gears. Therefore, when the front motor 9 rotates in a forward direction as shown in FIG. 4, the difference in rotation takes a positive value. Here, when the difference in rotation amount takes a positive value, a torque request is made to output a torque in the backward direction as shown in FIG. 4.

In step Sa12, the PHEV-ECU 32 instructs the P-lock-ECU 28 to release the parking lock at a predetermined timing synchronized with the torque request. In accordance with this instruction, the P-lock-ECU 28 unlocks the P-lock unit 20. Thus, the PHEV-ECU 32 functions as a lock control unit. After that, the PHEV-ECU 32 returns to step Sa1.

In other words, the parking lock is released at the time Tf, which is later than the time Te. Then, in the period PD which starts from the time Tf, the front motor 9 is rotated as the torsional stress acting on the front drive shafts 4a and 4b is released. In the example shown in FIG. 4, the rotation of the front motor 9 is in the forward direction. But, before the front motor 9 starts to rotate, a backward torque is output to the front motor 9. This torque serves as a load on the above-described rotation of the front motor 9, and thus the rotation of the front motor 9 is gentle.

That is, when no measures are taken, the front motor 9 rotates with the production of vigorous fluctuations represented by a broken line W in FIG. 4 since the torsional stress acting on the front drive shafts 4a and 4b is abruptly released. However, according to the embodiment, the front motor 9 rotates only with the production of the small fluctuations represented by a solid line in FIG. 4. This result indicates that with this embodiment, the shock produced upon release of the parking lock can be reduced as compared to the case where no measures are taken.

According to this embodiment, the torsional stress on the front drive shafts 4a and 4b is calculated in advance as the difference in rotation between the front motor 9 and the rear motor 10 when the parking lock state is set. Then, before the parking lock is released, the output of the torque is started. In this manner, the rotation of the front motor 9 which occurs upon the release of the torsional stress on the front drive shafts 4a and 4b can be suppressed from the beginning.

It should be noted here that FIGS. 2 and 4 schematically show an example of a roughly estimated tendency of the torque request pattern and thus the actual torque request pattern may differ from that is shown in these figures. For example, the difference in torque between patterns is exaggerated. In reality, experiments and simulations, etc., are carried out, and based on the actual operating characteristics of the automobile 100, torque request patterns are determined. From the determined patterns, a pattern data table is formed. The number of torque request patterns in the pattern data table may be any of two or more. Each and every torque request pattern is determined to such a degree that the automobile 100 does not move.

When the front motor 9 and rear motor 10 rotate in the backward direction immediately after being set in the parking lock state, the difference in rotation takes a negative value. Therefore, as shown in FIG. 2, a torque request pattern for outputting a forward torque, which is reverse to the aforementioned case, is selected. Thus, a torque which serves as a load on the backward direction rotation of the front motor 9 upon release of the torsional stress on the front drive shafts 4a and 4b is output by the front motor 9.

Therefore, regardless of whether the automobile 100 is in a forward-tilted or backward-tilted attitude, the shock caused upon the release of the parking lock can be reduced.

(Modified Version)

It should be noted here that the present invention is not limited to the embodiment described above, but modified into various versions as will now be described.

That is, the P-lock unit 20 may be provided in the rear reduction gear 7. In this case, the torsional stress is applied to the rear drive shafts 5a and 5b, and therefore the rear motor 10 is controlled to output a torque.

The torsional stress on the drive shafts can be estimated based on the angle of pitch of the main body 1 as well. In other words, the pattern data table may be determined to write the angle of pitch and torque request pattern while being associated with each other, and also to use torque request patterns associated with angles of pitch detected with the pitch angle sensor 27 while in the parking lock state.

The torque request may be started substantially at the same timing as that of the release of the parking lock state.

The computer comprising the CPU, ROM, RAM and non-volatile memory may be mounted on the inverter 13.

The connection state between the rotating shaft 8a and the front drive shafts 4a and 4b, the connection state between the rotating shaft 8a and the rotating shaft 11a, the connection state between the rotating shaft 9a and the front drive shafts 4a and 4b, or the connection state between the rotating shaft 11a and the front drive shafts 4a and 4b may not be selective, but may be physically connected from the beginning.

Similarly, the connection state between the rotating shaft 10a and the rear drive shafts 5a and 5b may not be selective, but may be physically connected from the beginning.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle control apparatus comprising:
    a first motor configured to drive wheels of one of a front side and a rear side provided on a vehicle;
    a second motor configured to drive wheels of another one of the front and rear sides provided on the vehicle;
    a first transmission mechanism comprising a drive shaft and configured to transmit a driving force produced by the first motor to the wheels of the one of the front and rear sides;
    a second transmission mechanism configured to transmit a driving force produced by the second motor to the wheels of the other one of the front and rear sides;
    a parking lock unit configured to create a parking lock state which inhibits transfer of the driving force produced by the first motor;
    a lock control unit configured to control the parking lock unit to release the parking lock state in response to an operation which requests the release of the parking lock state;
    a shift unit configured to change a running mode of the vehicle;
    a measuring unit configured to measure torsional stress on the drive shaft in the parking lock state based on a degree of rotation of each of the first motor and the second motor;
    a determination unit configured to determine, upon the release of the parking lock state by the lock control unit, a torque acting as a load on the rotation of the first motor upon the release of the torsional stress on the drive shaft, based on the torsion stress measured by the measuring unit; and
    a motor control unit configured to control the first motor to output the torque determined by the determination unit, wherein the motor control unit starts to control the first motor to output the torque in response to an operation of the shift unit and before the lock control unit starts to release the parking lock state.

2. The vehicle control apparatus of claim 1, wherein the motor control unit controls the first motor to output a higher torque as the torsional stress becomes larger.

3. A vehicle control apparatus, comprising:
a first motor configured to drive wheels of one of a front side and a rear side provided on a vehicle;
a second motor configured to drive wheels of another one of the front and rear sides provided on the vehicle;
a first transmission mechanism comprising a drive shaft and configured to transmit a driving force produced by the first motor to the wheels of the one of the front and rear sides;
a second transmission mechanism configured to transmit a driving force produced by the second motor to the wheels of the other one of the front and rear sides;
a parking lock unit configured to create a parking lock state which inhibits transfer of the driving force produced by the first motor;
a lock control unit configured to control the parking lock unit to release the parking lock state in response to an operation which requests the release of the parking lock state;
a measuring unit configured to measure torsional stress on the drive shaft in the parking lock state based on a degree of rotation of each of the first motor and the second motor;
a determination unit configured to determine, upon the release of the parking lock state by the lock control unit, a torque acting as a load on the rotation of the first motor upon the release of the torsional stress on the drive shaft, based on the torsion stress measured by the measuring unit; and
a motor control unit configured to control the first motor to output the torque determined by the determination unit,
wherein the measuring unit measures the amount of the torsional stress based on the difference in the degree of rotation between the first motor and the second motor from a time when the parking lock unit establishes the parking lock state.

4. The vehicle control apparatus of claim 3, wherein the determination unit forms a table in advance regarding a relationship between the difference in the degree of rotation between the first motor and the second motor, and the torque produced upon the release of the torsional stress of the drive shafts, or a relationship between the torsional stress and the torque produced upon the release of the torsional stress of the drive shafts, and determines the torque based on the table.

5. The vehicle control apparatus of claim 3, wherein the motor control unit controls the first motor to output a higher torque as the torsional stress becomes larger.

6. The vehicle control apparatus of claim 3, wherein the motor control unit starts to control the first motor to output the torque in response to an operation requesting release of the parking lock state before the lock control unit starts to release the parking lock state.

* * * * *